July 1, 1941.   J. H. OLSEN   2,247,450
HUNTER'S DECOY
Filed Feb. 15, 1940
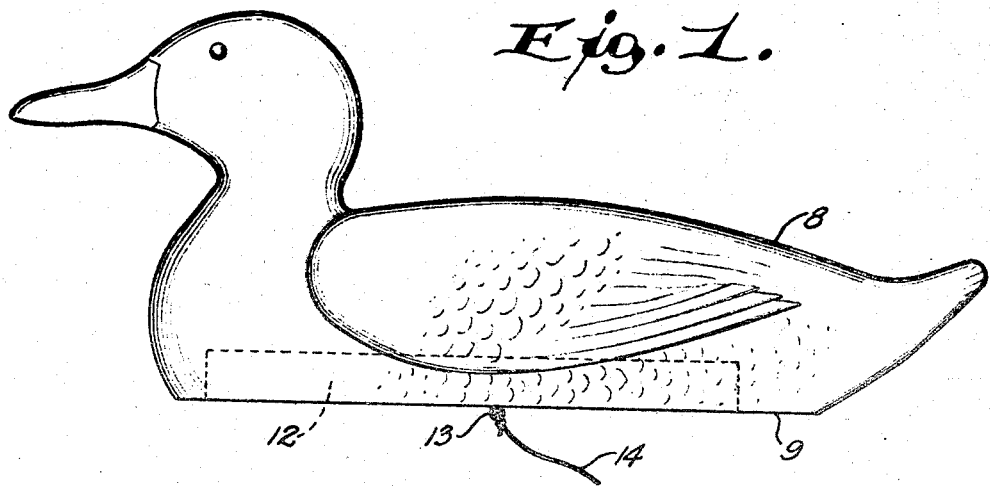
Fig. 1.
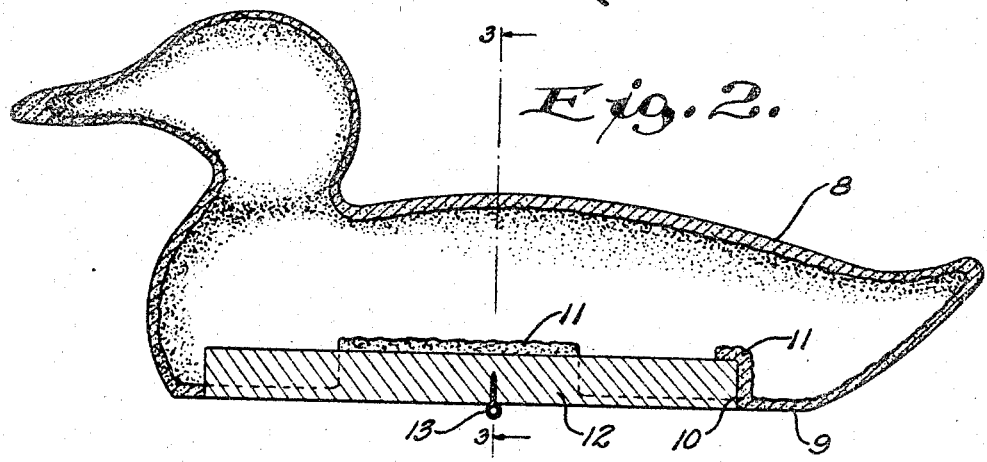
Fig. 2.
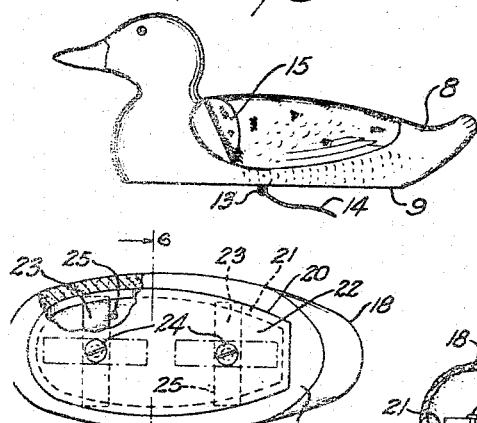
Fig. 4.
Fig. 5.
Fig. 6.
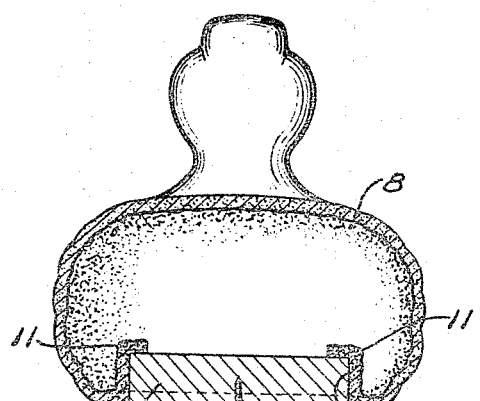
Fig. 3.
INVENTOR
J. H. Olsen
BY
Morsell, Lieber & Morsell
ATTORNEYS.

Patented July 1, 1941

2,247,450

UNITED STATES PATENT OFFICE 2,247,450

HUNTER'S DECOY

John H. Olsen, Milwaukee, Wis., assignor to Pulp Reproduction Company, Milwaukee, Wis., a corporation of Wisconsin Application February 15, 1940, Serial No. 319,055

7 Claims. (Cl. 43—3)

My present invention relates generally to improvements in the art of manufacturing articles from light fibrous material such as moldable pulp, and relates more specifically to improvements in the construction of hunters' decoys.

Generally defined, an object of my invention is to provide an improved buoyant decoy which is simple and durable in construction, and which is especially adapted to be manufactured of molded pulp, papier-mâché, or other light fibrous material.

It is common practice in hunting and other sports to utilize life-like imitation ducks, geese, or the like to lure the game to the vicinity wherein the hunter is hidden. These decoys have heretofore customarily been manufactured of wood; and because of the care which must be exercised in carving the decoy to obtain perfect balance as well as produce a realistic figure, the cost of such a decoy is necessarily rather high. Consequently the average hunter cannot afford to buy as many of these decoys as he should possess to effectively attract game to the vicinity desired, and extreme care must be taken in storing the decoys during the off season and in anchoring the decoys when in use because of possible loss or damage thereto. Furthermore, although decoys are ordinarily carved out of the lightest wood possible, they are undesirably heavy as they are often transported over considerably long distances in large quantities.

It is therefore a more specific object of the present invention to provide a highly realistic decoy which may be readily manufactured at moderate cost as compared to present high grade decoys, and which is of exceptionally light weight.

Another specific object of the invention is to provide a balanced light weight buoyant decoy which will remain afloat even when battered and perforated with shot.

Still another specific object of my invention is to provide a decoy having a relatively elastic surface which has a tendency to cause shot to rebound rather than enter the body thereof.

A further specific object of my present invention is to provide a decoy which may be readily molded to more accurately simulate the real bird, animal, or the like which it is intended to portray.

These and other objects and advantages will be apparent from the following detailed description.

A clear conception of an embodiment of the invention, and of the mode of constructing decoys in accordance with the improvement, may be had by referring to the drawing accompanying and forming a part of this specification wherein like reference characters designate the same or similar parts in the several views.

Fig. 1 is a side elevation of one of my improved decoys simulating a duck;

Fig. 2 is a central longitudinal vertical section through the decoy of Fig. 1;

Fig. 3 is a transverse vertical section through the decoy taken along the line 3—3 of Fig. 2;

Fig. 4 is a side elevation of a modified type of decoy provided with canvas side coverings and having a portion of the protective canvas turned back;

Fig. 5 is a bottom view of a further modified decoy having a removable base plate, a portion of the structure being broken away to show internal elements; and Fig. 6 is a transverse vertical section through the decoy taken along the line 6—6 of Fig. 5.

While the improved decoy has been shown specifically as representing a duck decoy manufactured of molded pulp and having a wood base, it is not the intent to thereby unnecessarily restrict the scope, since various other game may be simulated and the decoy may obviously be manufactured of papier-mâché or other light moldable material, and may be provided with a base of any suitable buoyant material.

Referring to the drawing and particularly to Figs. 1, 2, and 3, the decoy specifically illustrated comprises in general, a light hollow molded shell 8 of approximately uniform thickness formed to simulate the body of a duck and having a substantially flat base 9 provided with an elongated downwardly open recess 10 molded therein. Surrounding the opening or recess 10 and molded integral with the body, is a series of flanges or positioning stops 11 which are adapted to coact with and retain in position a closure base plate 12 of buoyant material such as wood which snugly fits the recess 10 and may be adhesively or otherwise secured to the flanges or stops 11 within the recess 10. The plate 12 carries an eye 13 in the bottom thereof to which a cord 14 may be secured for anchoring the decoy in a desired locality, and the exterior of the shell 8 may be waterproofed and painted or otherwise treated to represent a live feathered bird, as well as to protect the fibrous material.

In the modification shown in Fig. 4, a protective sheet 15 of canvas, metal screening, or the like is applied in any suitable manner to the exterior of the decoy body 8 at the zone of the wing portions thereof. The provision of the sheet 15 in the manner shown insures a higher degree of resistance to shot, water damage, rough treatment, or the like, at those body portions of the decoy which normally receive the greatest abuse.

Referring to Figs. 5 and 6 illustrating a modified base structure for my decoy, the hollow shell 18 is molded with a substantially flat base 19 provided with an elongated opening 20 having a continuous integral flange or positioning stop 21. The buoyant closure plate 22 for the opening 20 is provided with rotable retaining bars 23 spaced therefrom and carried by pivot wood screws 24, while stop nails or rods 25 may also be secured to the plate 22 for limiting the extent of rotation of the bars 23. In applying this removable base to the decoy, the bars 23 are first rotated to a position lengthwise of the closure plate 22 as shown in dot-and-dash lines in Fig. 5 and the buoyant plate 22 is then positioned snugly within the opening 20 against the stop 21, with the bars 23 disposed within the interior of the decoy above the flange 21. A pivotal movement is then imparted to the screws 24, and this movement is transmitted to the bars 23, shifting these bars transversely of the base plate and into contact with the stop nails 25 as clearly shown in Figs. 5 and 6. When the bars 23 have been rotated to this position, they overlap the flange or stop 21 and the screws 24 may then be tightened to clamping position, while the nails 25 prevent rotation thereof about the screw axes. An eye 13 may also be secured to the bottom of the plate 22 as shown in Fig. 1, for anchoring purposes.

From the foregoing specific description it will be apparent that the present invention provides an extremely simple and effective decoy adapted to be manufactured of paper pulp or other light moldable material at moderate cost. The buoyant base is very important as it obviously imparts perfect balance to the decoy while afloat, and maintains the decoy in an upright position at all times because of the low center of gravity and due to uniform weight distribution. The provision of a protective sheet over body portions of the decoy as in Fig. 4, may greatly add to the life thereof; and the provision of a removable base, as in Figs. 5 and 6, provides for convenient internal inspection, and permits sale of the molded bodies independently of the base which may be used almost indefinitely on successive decoys, or on different types. The improved decoy meets a great demand by hunters for life-like imitation ducks, geese, and the like, at moderate cost, and has proven highly successful in actual commercial use. These decoys obviously are extremely light in weight besides being most attractive and inexpensive, and the buoyant bases cooperating with the thin walled hollow bodies will always maintain the decoys in righted position.

It should be understood that it is not desired to limit this invention to the exact details of construction herein shown and described, for various modifications within the scope of the claims may occur to those skilled in the art.

I claim:

1. An article of manufacture comprising, a hollow decoy of light molded material, said decoy having a base provided with a central recess, positioning stops formed of said molded material and integral with said base about and within said recess, and a relatively heavy buoyant closure plate for said base secured entirely within said recess against said stops with its lower surface substantially flush with said base.

2. An article of manufacture comprising, a hollow decoy of fibrous material, said decoy having a recessed base, positioning stops formed integral with said base about said recess, and a buoyant closure plate for said base detachably secured within said recess against said stops, said plate being provided with a pivotally mounted retaining latch manipulable from the exterior and adapted to cooperate with said stops to retain said plate in position.

3. An article of manufacture comprising, a hollow decoy of fibrous material, said decoy having a recessed base, a continuous positioning stop formed integral with said base about said recess, a buoyant closure plate for said base, and a pivotally mounted retaining bar on said plate cooperable with said stop for detachably securing said plate within said recess, said retaining bar being manipulated from the exterior of said decoy.

4. An article of manufacture comprising, a hollow decoy having a body formed of relatively light molded fibrous pulp and having a base provided with a central bottom recess, positioning stops of said pulp disposed on opposite sides of and constituting an abutting surface of said recess, and a relatively heavy wooden closure plate for said base disposed entirely within said recess against said stops with its lower surface approximately flush with the bottom of said base.

5. An article of manufacture comprising, a hollow decoy having an elongated body formed of relatively light molded fibrous pulp of approximately uniform thickness throughout, said body having a base provided with an elongated central downwardly open recess and positioning stops molded integral with the body and disposed about and constituting an upper surface of said recess, and a relatively heavy buoyant closure plate snugly fitting said recess and coacting with said stops so that the lower surface of the plate is approximately flush with the base bottom.

6. An article of manufacture comprising, a hollow decoy body having a recess in its base and positioning stops adjoining said recess, a relatively heavy closure plate snugly fitting said recess and engaging said stops to cause the lower surface of the plate to lie approximately flush with the base bottom, and a pivoted retaining bar associated with said plate and being cooperable with said stops to detachably secure said plate to said body.

7. An article of manufacture comprising, a hollow decoy body having a bottom recess and stops adjoining said recess, a closure plate fitting said recess and coacting with said stops, a retaining bar pivotally secured to said plate and being cooperable with said stops within said body to detachably secure said plate to said body, and means for manipulating said bar to attach and detach said plate.

JOHN H. OLSEN.